(12) United States Patent
Ma et al.

(10) Patent No.: US 12,254,610 B2
(45) Date of Patent: Mar. 18, 2025

(54) DETECTION METHOD, TERMINAL DEVICE, AND COMPUTER-READABLE STORAGE MEDIUM

(71) Applicant: CONTEMPORARY AMPEREX TECHNOLOGY (HONG KONG) LIMITED, Hong Kong (CN)

(72) Inventors: Lin Ma, Ningde (CN); Ziyang Shen, Ningde (CN); Zhipeng Zhang, Ningde (CN); Ping Jiang, Ningde (CN); Gaofeng Lu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 113 days.

(21) Appl. No.: 18/229,330

(22) Filed: Aug. 2, 2023

(65) Prior Publication Data
US 2024/0193750 A1    Jun. 13, 2024

Related U.S. Application Data

(63) Continuation of application No. PCT/CN2023/085105, filed on Mar. 30, 2023.

(30) Foreign Application Priority Data

Dec. 12, 2022   (CN) .......................... 202211589172.8

(51) Int. Cl.
*H04N 23/90* (2023.01)
*B23K 31/12* (2006.01)
(Continued)

(52) U.S. Cl.
CPC .......... *G06T 7/0004* (2013.01); *B23K 31/125* (2013.01); *H01M 10/42* (2013.01);
(Continued)

(58) Field of Classification Search
None
See application file for complete search history.

(56) References Cited

U.S. PATENT DOCUMENTS

| 9,118,782 B1 | 8/2015 | Coley et al. |
| 2020/0363344 A1 * | 11/2020 | Heo ........................ G01N 23/18 |

(Continued)

FOREIGN PATENT DOCUMENTS

| CN | 106513937 A | 3/2017 |
| CN | 107810080 A | 3/2018 |

(Continued)

OTHER PUBLICATIONS

Rohkohl, "How to characterize a NDT method for weld inspection in battery cell manufacturing using deep learning" (Year: 2022).*

(Continued)

*Primary Examiner* — Eileen M Adams
(74) *Attorney, Agent, or Firm* — ANOVA LAW GROUP, PLLC (57) ABSTRACT

A detection method includes acquiring a first shot image of a long-side weld of a battery cell under detection by using a first structured light camera on a long side of the battery cell under detection, acquiring a second shot image of a short-side weld of the battery cell under detection by using a second structured light camera on the short side of the battery cell under detection, detecting a defect of the long-side weld of the battery cell under detection based on the first shot image, and detecting a defect of the short-side weld of the battery cell under detection based on the second shot image.

4 Claims, 6 Drawing Sheets

(51) Int. Cl.
  *G06T 7/00* (2017.01)
  *H01M 10/42* (2006.01)
  *H04N 23/698* (2023.01)
  *H04N 23/73* (2023.01)
  *H04N 23/951* (2023.01)
  *H01M 50/169* (2021.01)

(52) U.S. Cl.
  CPC ........... *H04N 23/698* (2023.01); *H04N 23/73* (2023.01); *H04N 23/90* (2023.01); *H04N 23/951* (2023.01); *H01M 50/169* (2021.01)

(56) References Cited

U.S. PATENT DOCUMENTS

| | | | | |
|---|---|---|---|---|
| 2022/0357294 | A1* | 11/2022 | Joung | H01M 10/4285 |
| 2023/0140944 | A1* | 5/2023 | Lee | G01N 21/8851 |
| | | | | 702/63 |
| 2023/0251212 | A1* | 8/2023 | Wagner | G06T 7/73 |
| | | | | 382/141 |

FOREIGN PATENT DOCUMENTS

| | | |
|---|---|---|
| CN | 207992073 U | 10/2018 |
| CN | 110072044 A | 7/2019 |
| CN | 209542486 U | 10/2019 |
| CN | 1111156925 A | 5/2020 |
| CN | 112419420 A | 2/2021 |
| CN | 112748120 A | 5/2021 |
| CN | 112986260 A | 6/2021 |
| CN | 113920158 A | 1/2022 |
| CN | 114693626 A | 7/2022 |
| CN | 115423735 A | 12/2022 |
| CN | 115661137 A | 1/2023 |
| JP | 2017219425 A | 12/2017 |
| WO | 2022205810 A1 | 10/2022 |

OTHER PUBLICATIONS

The World Intellectual Property Organization (WIPO) International Search Report for PCT/CN2023/085105 Jun. 26, 2023 6 pages (including English translation).
The China National Intellectual Property Administration (CNIPA) The First Office Action for Chinese Application 202211589172.8 Feb. 1, 2023 23 Pages (With Translation).
The China National Intellectual Property Administration (CNIPA) The Second Office Action for Chinese Application 202211589172.8 Mar. 10, 2023 22 Pages (With Translation).
The China National Intellectual Property Administration (CNIPA) Notice of Grant of Invention Patent Right for Application No. 202211589172.8 Sep. 28, 2023 12 pages (including translation).

* cited by examiner

DETECTION METHOD, TERMINAL DEVICE, AND COMPUTER-READABLE STORAGE MEDIUM

CROSS-REFERENCE TO RELATED APPLICATIONS

This application is a continuation of International Application No. PCT/CN2023/085105, filed on Mar. 30, 2023, which claims priority to Chinese Patent Application No. 202211589172.8, filed with the China National Intellectual Property Administration on Dec. 12, 2022 and entitled "DETECTION DEVICE, DETECTION METHOD, TERMINAL DEVICE, AND COMPUTER-READABLE STORAGE MEDIUM", which are incorporated herein by reference in their entirety.

TECHNICAL FIELD

This application relates to the technical field of detection, and in particular, to a detection method, a terminal device, and a computer-readable storage medium.

BACKGROUND

During welding between a top cover of a battery cell and an aluminum shell, defects such as weld-induced puncture, broken weld, welding slag residues, and false welding are prone to occur at a weld seam between the top cover and aluminum shell due to improper laser power adjustment or impurities existent at the seam between the top cover and aluminum shell or for other reasons. Currently, the weld seam is usually scanned by a 3D laser camera. A weld image acquired by scanning is inspected to detect weld defects.

The resolution of a 3D laser camera is closely related to the line frequency. To be specific, the higher the resolution, the lower the line frequency (the number of lines scanned per second). In a high-speed production environment, the scanning speed of the 3D laser camera is high (that is, the line frequency is high), and the corresponding resolution is low. The low resolution impairs the precision of image detection, and in turn, impairs the precision of detecting the weld defects of the battery cell.

SUMMARY

Some embodiments of this application provide a detection method, a terminal device, and a computer-readable storage medium to solve the problem of inaccuracy of detecting welds of a battery cell in a high-speed production environment.

According to a first aspect, a detection method is provided. The detection method is applied to a detection device. The detection device includes 2N first structured light cameras and 2M second structured light cameras. N first structured light cameras are disposed on each long side of a battery cell under detection, and M second structured light cameras are disposed on each short side of the battery cell under detection, where N and M are both positive integers. The N first structured light cameras on each long side of the battery cell under detection are mounted symmetrically around an axis that is a long-side perpendicular bisector of the battery cell under detection. The M second structured light cameras on each short side of the battery cell under detection are mounted symmetrically around an axis that is a short-side perpendicular bisector of the battery cell under detection.

The detection method includes:
acquiring a first shot image of a long-side weld of the battery cell under detection by using a first structured light camera on the long side of the battery cell under detection;
acquiring a second shot image of a short-side weld of the battery cell under detection by using a second structured light camera on the short side of the battery cell under detection;
detecting a defect of the long-side weld of the battery cell under detection based on the first shot image; and
detecting a defect of the short-side weld of the battery cell under detection based on the second shot image.

When N is an integer greater than 1, the acquiring a first shot image of a long-side weld of the battery cell under detection by using a first structured light camera on the long side of the battery cell under detection includes:
controlling, for each long side of the battery cell under detection, at least one first camera among the N first structured light cameras on the long side to expose simultaneously, so as to acquire a first shot image captured by the first camera, where fields-of-view do not overlap between the first cameras;
controlling, after acquiring the first shot image captured by the first camera, at least one second camera among the N first structured light cameras on the long side to expose simultaneously, so as to acquire a first shot image captured by the second camera, where fields-of-view do not overlap between the second cameras, and the second camera is a structured light camera other than the first camera among the N first structured light cameras on the long side;
controlling a third camera and a fourth camera among the 2N first structured light cameras of the detection device to expose simultaneously, where the third camera and the fourth camera are located on different long sides of the battery cell under detection respectively, and a mounting position of the third camera is not symmetric to the mounting position of the fourth camera around a short-side perpendicular bisector of the battery cell under detection; and
controlling, after acquiring the first shot image captured by the third camera and the first shot image captured by the fourth camera, a fifth camera and a sixth camera to expose simultaneously, where the fifth camera and the sixth camera are located on different long sides of the battery cell under detection respectively, a mounting position of the fifth camera is not symmetric to the mounting position of the sixth camera around the short-side perpendicular bisector of the battery cell under detection, and the fifth camera and the sixth camera are the first structured light cameras other than the third camera and the fourth camera.

In an embodiment, when N is equal to 2, the detection device includes 4 first structured light cameras, and 2 first structured light cameras are disposed on each long side of the battery cell under detection.

Correspondingly, the acquiring a first shot image of a long-side weld of the battery cell under detection by using a first structured light camera on the long side of the battery cell under detection includes:
controlling a seventh camera and an eight camera among the 4 first structured light cameras of the detection device to expose simultaneously, where the seventh camera and the eighth camera are located on different long sides of the battery cell under detection respectively and located on two sides of the long-side perpendicular bisector of the battery cell under detection respectively; and controlling, after acquiring the first shot image captured by the seventh camera and the first shot image captured by the eighth camera, a ninth camera and a tenth camera among the 4 first structured light cameras of the detection device to expose simultaneously, so as to acquire a first shot image captured by the ninth camera and a first shot image captured by the tenth camera, where the ninth camera and the tenth camera are located on different long sides of the battery cell under detection respectively and located on the two sides of the long-side perpendicular bisector of the battery cell under detection respectively, and the ninth camera and the tenth camera are the first structured light cameras other than the seventh camera and the eighth camera.

According to a second aspect, a terminal device is provided, including a memory, a processor, and a computer program stored in the memory and executable on the processor. When executing the computer program, the processor implements the detection method according to any one of the implementations of the first aspect.

According to a third aspect, a computer-readable storage medium is provided. The computer-readable storage medium stores a computer program. When executed by a processor, the computer program implements the detection method according to any one of the implementations of the first aspect.

Beneficial effects of the detection method according to some embodiments of this application are: in some embodiments of this application, the shot image acquired by the structured light camera is processed to detect the weld defects of the battery cell. The image captured by the structured light camera is of a high resolution and a wide angle-of-view, thereby improving the detection precision. In addition, a plurality of structured light cameras located on different sides of the battery cell and mounted at non-opposite positions are controlled to expose simultaneously, thereby effectively avoiding interference between the structured light beams emitted by the structured light cameras on different sides of the battery cell during imaging, effectively improving the shooting effect, and in turn, improving the detection precision.

Understandably, the beneficial effects of the second aspect to the third aspect may be learned by reference to the relevant description in the first aspect, and are omitted here.

BRIEF DESCRIPTION OF DRAWINGS

To describe the technical solutions in some embodiments of this application more clearly, the following outlines the drawings to be used in the description of some embodiments of this application. Evidently, the drawings outlined below are merely some embodiments of this application. A person of ordinary skill in the art may derive other drawings from such drawings without making any creative efforts.

DETAILED DESCRIPTION OF EMBODIMENTS

For purposes of illustration rather than limitation, the following description gives details such as a specific system architecture and techniques to enable thorough understanding of some embodiments of this application. However, to a person skilled in the art, this application may still be implemented in other embodiments without such details. In other circumstances, detailed descriptions of well-known systems, devices, circuits, and methods are omitted so as not to obscure the description of this application with unnecessary details.

Understandably, as used in the specification and claims of this application, the terms "include" and "comprise" mean the presence of stated features, entirety, steps, operations, elements, and/or components, but without excluding the presence or addition of one or more other features, entirety, steps, operations, elements, components, and/or any combination thereof.

Understandably, the term "and/or" used in the specification and claims of this application to link the correlated items means any and all possible combinations of one or more of the items, including the items before and after the term.

As used in the specification and the appended claims of this application, the term "if" may be construed, depending on the context, as "when" or "once" or "in response to determining" or "in response to detecting". Similarly, depending on the context, the phrase "if determining" or "if [condition or event stated] is detected" may be construed as "once determining", or "in response to determining", or "once (condition or event stated) is detected", or "in response to detecting (condition or event stated)".

In addition, in the descriptions of the specification and appended claims of this application, the terms "first", "second", "third", and so on are merely intended for ease of differentiation, but not intended to indicate or imply order of precedence.

Reference to "an embodiment" or "some embodiments" or the like in the specification of this application means that a specific feature, structure, or characteristic described with reference to such embodiment(s) is included in one or more embodiments of this application. Therefore, unless otherwise expressly specified, the phrases "in an embodiment", "in some embodiments", "in some other embodiments", "in still other embodiments", and the like used in different places of this specification are not necessarily reference to the same embodiment, but mean "one or more but not all embodiments".

During welding between a top cover of a prismatic battery cell and an aluminum shell, defects such as weld-induced puncture, broken weld, welding slag residues, and false welding are prone to occur at a weld seam between the top cover and aluminum shell due to improper laser power adjustment or impurities existent at the seam between the top cover and aluminum shell or for other reasons. Currently, the weld seam is usually scanned by a 3D laser camera. A weld image acquired by scanning is inspected to detect weld defects.

Figure 1:
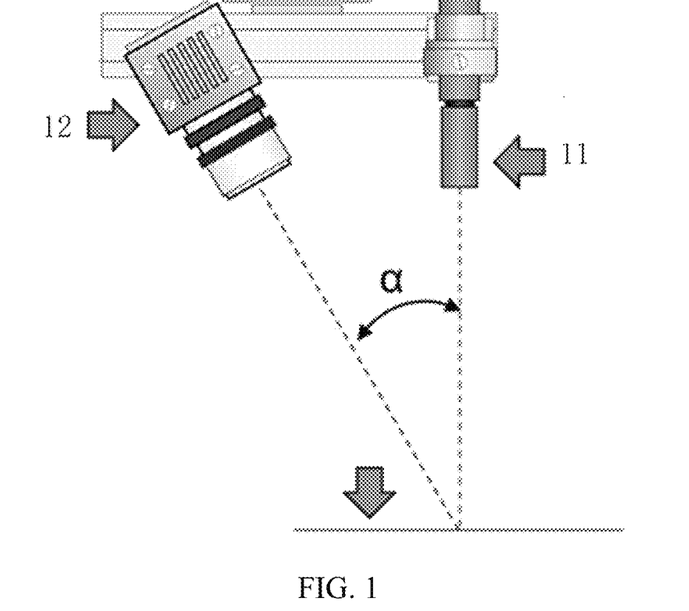
FIG. 1 is a schematic diagram of imaging principles of a 3D laser camera according to an embodiment of this application.

In the related art, the 3D laser camera means a laser line scan camera. FIG. 1 is a schematic diagram of imaging principles of a 3D laser camera according to an embodiment of this application. As shown in FIG. 1, a 3D laser camera includes an emitter 11 and a sensor 12. The working principles of the 3D laser camera are: The emitter 11 projects laser dots or lines onto an object, and the sensor 12 acquires the laser beam reflected by the object. The distance between the sensor 12 and the emitter 11 is known. Therefore, a distance between the object and the emitter can be calculated precisely based on a reflection angle α of the laser beam.

From the principles of the 3D laser camera, it can be seen that the 3D laser camera can scan up to one line of image at a time, and acquire a complete image of the object by scanning for a plurality of times. Therefore, the resolution of a 3D laser camera is closely related to the line frequency. To be specific, the higher the resolution, the lower the line frequency (the number of lines scanned per second). In a high-speed production environment (for example, the battery cell moves at a speed of 300 mm/s), the scanning speed of the 3D laser camera is high (that is, the line frequency is high), and the corresponding resolution is low. The low resolution impairs the precision of image detection, and in turn, impairs the precision of detecting the weld defects of the battery cell. In addition, due to a small field-of-view of the 3D laser camera, a corner image at an intersection between a long-side weld and a short-side weld is prone to be lost (also known as R corner loss) during weld detection at the top cover of the battery cell, thereby impairing the detection accuracy.

To solve the above problem, an embodiment of this application provides a detection device and a detection method. In the detection device according to this embodiment of this application, a structured light camera is used instead of a 3D laser camera, thereby effectively solving the problem of inaccurate weld detection of the battery cell in a high-speed production environment. In addition, the detection method according to this embodiment of this application can effectively reduce the interference between the structured light beams on the same side of the battery cell, thereby improving the detection precision.

The detection device according to this embodiment of this application includes:
- a first structured light camera, located on a long side of a battery cell under detection and configured to shoot an image of a long-side weld of the battery cell under detection; and
- a second structured light camera, located on a short side of the battery cell under detection and configured to shoot an image of a short-side weld of the battery cell under detection.

In this embodiment of this application, in view of the requirements on the detection region of the battery cell after welding, detection workspaces are arranged on two long sides and two short sides at which the top cover of the battery cell is welded to an aluminum shell. The following describes the long-side detection layout and the short-side detection layout of the battery cell.

The structured light camera in this embodiment of this application may be a 3D structured light camera, that is, a camera that can shoot depth images and grayscale images.

It is hereby noted that in this embodiment of this application, a coordinate system used in the relevant schematic diagrams (FIG. 2, FIG. 5, FIG. 9, and FIG. 10) of the long-side detection layout of the battery cell employs the following coordinate axes: a straight line formed by the short side of the battery cell is an x1 axis, a straight line formed by the long side of the battery cell is a z1 axis, and a straight line formed by a height side of the battery cell is a y1 axis. A coordinate system used in the relevant schematic diagrams (FIG. 3 and FIG. 6) of the short-side detection layout of the battery cell employs the following coordinate axes: the straight line formed by the long side of the battery cell is an x2 axis, the straight line formed by the short side of the battery cell is a z2 axis, and the straight line formed by the height side of the battery cell is a y2 axis.

Figure 2:
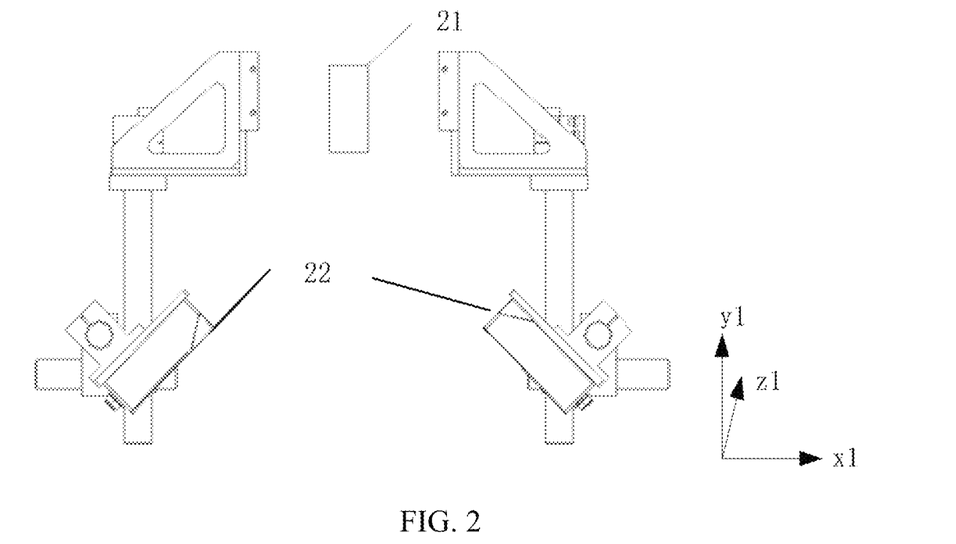
FIG. 2 is a front view of a long-side detection layout of a battery cell according to an embodiment of this application.

FIG. 2 is a front view of a long-side detection layout of a battery cell according to an embodiment of this application. The front view of the long-side detection layout of the battery cell is a view obtained by observing along a positive direction of the z1 axis. As shown in FIG. 2, the detection device in this embodiment of this application includes a first structured light camera 22. The first structured light camera 22 is disposed on each of two welded long sides of the battery cell 21 (that is, the battery cell under detection).

Figure 3:
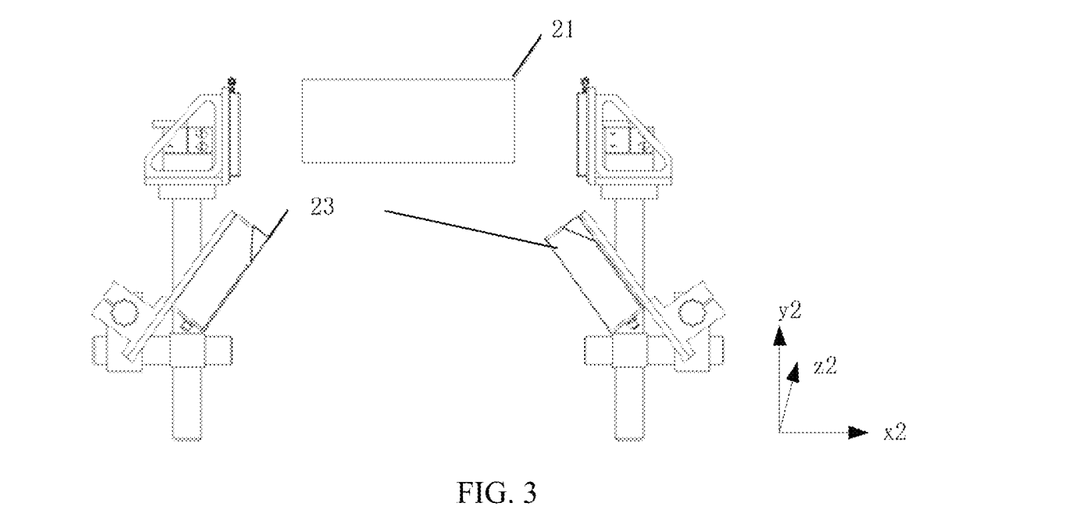
FIG. 3 is a front view of a short-side detection layout of a battery cell according to an embodiment of this application.

FIG. 3 is a front view of a short-side detection layout of a battery cell according to an embodiment of this application. The front view of the short-side detection layout of the battery cell is a view obtained by observing along a positive direction of the z2 axis. As shown in FIG. 3, the detection device in this embodiment of this application further includes a second structured light camera 23. The second structured light camera 23 is disposed on each of two welded short sides of the battery cell 21.

In some application scenarios, the detection workspace of long-side detection and the detection workspace of short-side detection may be integrated together. In such application scenarios, after the battery cell 21 is in position, both the shot image of the long-side weld of the battery cell 21 and the shot image of the short-side weld of the battery cell 21 can be acquired.

In some other application scenarios, the detection workspace of long-side detection and the detection workspace of short-side detection may be disposed separately. In such application scenarios, the battery cell 21 arrives at the detection workspace of long-side detection first to acquire the shot image of the long-side weld of the battery cell 21, and then the battery cell 21 is conveyed to the detection workspace of short-side detection to acquire the shot image of the short-side weld of the battery cell 21.

Figure 4:
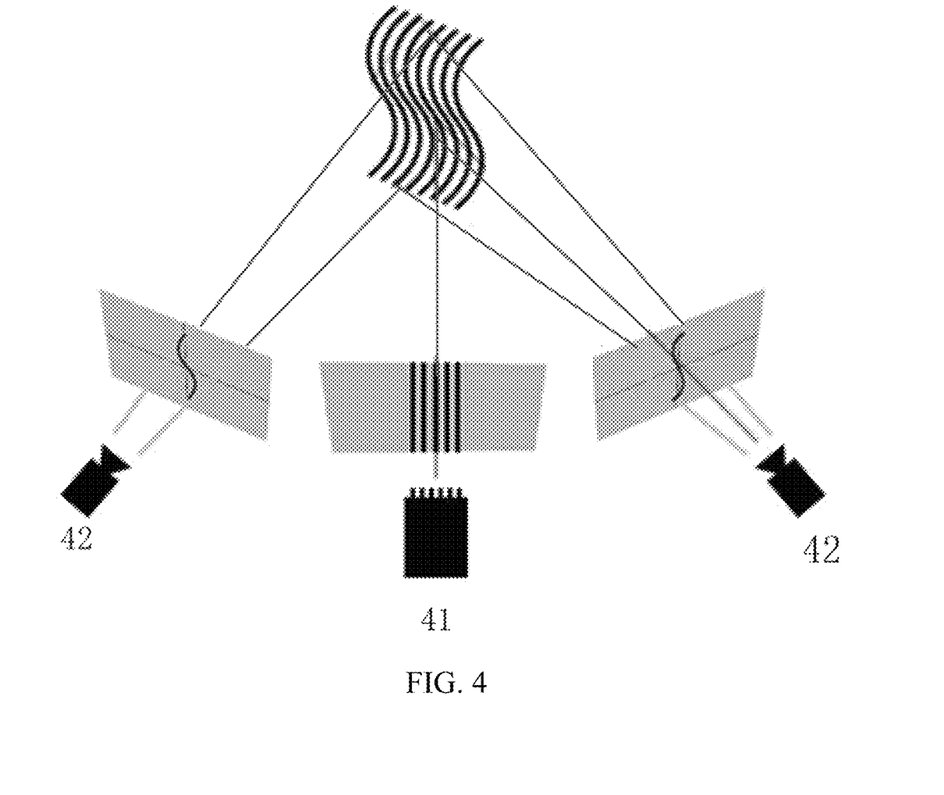
FIG. 4 is a schematic diagram of working principles of a structured light camera according to an embodiment of this application.

FIG. 4 is a schematic diagram of working principles of a structured light camera according to an embodiment of this application. As shown in FIG. 4, the structured light camera includes a light source 41 and a sensor 42. The working principles of the camera are: the light source 41 (such as an LCD projector or other stable light source) projects a light pattern onto an object, and one or more (2 sensors are shown in FIG. 4) sensors 42 observe the shape of the light pattern, and calculate a distance of each point in the field of view. The structured light emitted by the light source during the scanning may be white or blue. The light pattern may be formed of a series of stripes, or formed of a dot matrix or other shapes.

Unlike 3D laser cameras, the structured light camera works by projecting the light pattern onto an object to be scanned, rather than by emitting laser dots or laser lines. Therefore, the advantages of the structured light camera lie in a wide scanning range, a fast scanning speed, and a relatively high resolution.

In this embodiment of this application, the structured light camera is used instead of a 3D laser camera. By virtue of the characteristics of a wide scanning range and a fast scanning speed of the structured light camera, one-shot imaging of the weld of the battery cell is implemented, thereby greatly improving the detection efficiency and satisfying high-speed production requirements on the basis of ensuring a relatively high resolution of the image. Therefore, the detection device according to this application can effectively solve the problem of inaccuracy of detecting welds of a battery cell in a high-speed production environment. In addition, the field of view of the structured light camera is relatively wide, and can effectively avoid the phenomenon of R corner loss.

As shown in the embodiments illustrated in FIG. 2 and FIG. 3, at least one structured light camera is disposed on each long side/short side of the battery cell 21. Specifically, the detection device includes 2N first structured light cameras 22 and 2M second structured light cameras 23, where N and M are positive integers. N first structured light cameras 22 are disposed on each long side of the battery cell 21, and M second structured light cameras 23 are disposed on each short side of the battery cell 21.

To ensure complete imaging of the weld of the battery cell, in some embodiments, the N first structured light cameras 22 located on each long side of the battery cell 21 are mounted symmetrically around an axis that is a perpendicular bisector of the long side of the battery cell 21, and the M second structured light cameras 23 located on each short side of the battery cell 21 are mounted symmetrically around an axis that is a perpendicular bisector of the short side of the battery cell 21.

Figure 5:
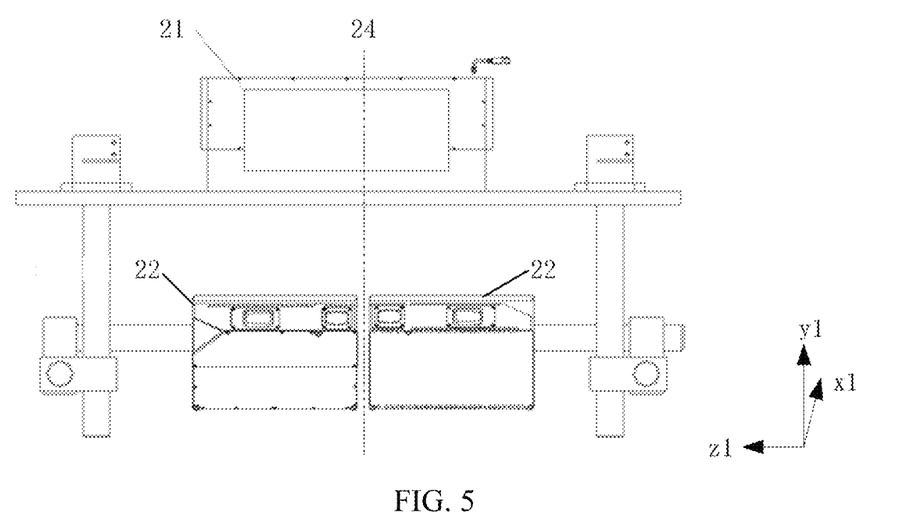
FIG. 5 is a left view of a long-side detection layout of a battery cell according to an embodiment of this application.

The following describes the long-side detection layout of the battery cell as an example. FIG. 5 is a left view of a long-side detection layout of a battery cell according to an embodiment of this application. The left view of the long-side detection layout of the battery cell is a view obtained by observing along a positive direction of the x1 axis. FIG. 5 shows a scenario in which 2 first structured light cameras 22 are disposed on one long side of the battery cell 21. As shown in FIG. 5, the 2 first structured light cameras 22 are symmetrical about the perpendicular bisector 24 of the long side of the battery cell 21.

The perpendicular bisector, also known as a vertical bisector, means a straight line that passes through a midpoint of a line segment and that is perpendicular to the line segment. In this embodiment of this application, a long-side perpendicular bisector 24 means a straight line that passes through the midpoint of the long side of the battery cell 21 and that is perpendicular to the long side of the battery cell 21. Similarly, a short-side perpendicular bisector means a straight line that passes through the midpoint of the short side of the battery cell 21 and that is perpendicular to the short side of the battery cell 21.

It is hereby noted that, in practical applications, when the long side of the battery cell 21 is uneven, the long side may be not straight enough to be considered as a line segment. In this case, the longest line segment in the length direction of the battery cell 21 may be used as the long side of the battery cell 21, and the perpendicular bisector of this line segment is used as the long-side perpendicular bisector 24 of the battery cell 21.

Optionally, in another implementation, with respect to a midpoint in the length direction of the battery cell 21, a straight line that passes through the midpoint and that is perpendicular to the length direction of the battery cell 21 is defined as the long-side perpendicular bisector of the battery cell 21.

FIG. 5 shows just a scenario in which 2 structured light cameras are disposed on a single side of the long side. When 1 structured light camera is disposed on a single side of the long side of the battery cell 21, the camera being mounted symmetrically around an axis that is the long-side perpendicular bisector 24 of the battery cell 21 may mean: aligning a central axis of the field-of-view of the 1 structured light camera with the long-side perpendicular bisector 24 of the battery cell 21.

In the above circumstance, it is understandable that, when N is an even number, that is, when an even number of structured light cameras are disposed on each long side of the battery cell 21, N/2 structured light cameras may be disposed on each of two sides of the long-side perpendicular bisector 24 of the battery cell 21, so that the N structured light cameras are distributed symmetrically around an axis that is the long-side perpendicular bisector 24 of the battery cell 21. When N is an odd number, that is, when an odd number of structured light cameras are disposed on each long side of the battery cell 21, a central axis of the field-of-view of a structured light camera located in the middle may be aligned with the long-side perpendicular bisector 24 of the battery cell 21, and remaining N−1 structured light cameras are distributed symmetrically on two sides of the middle structured light camera around an axis that is the long-side perpendicular bisector 24 of the battery cell 21.

Figure 6:
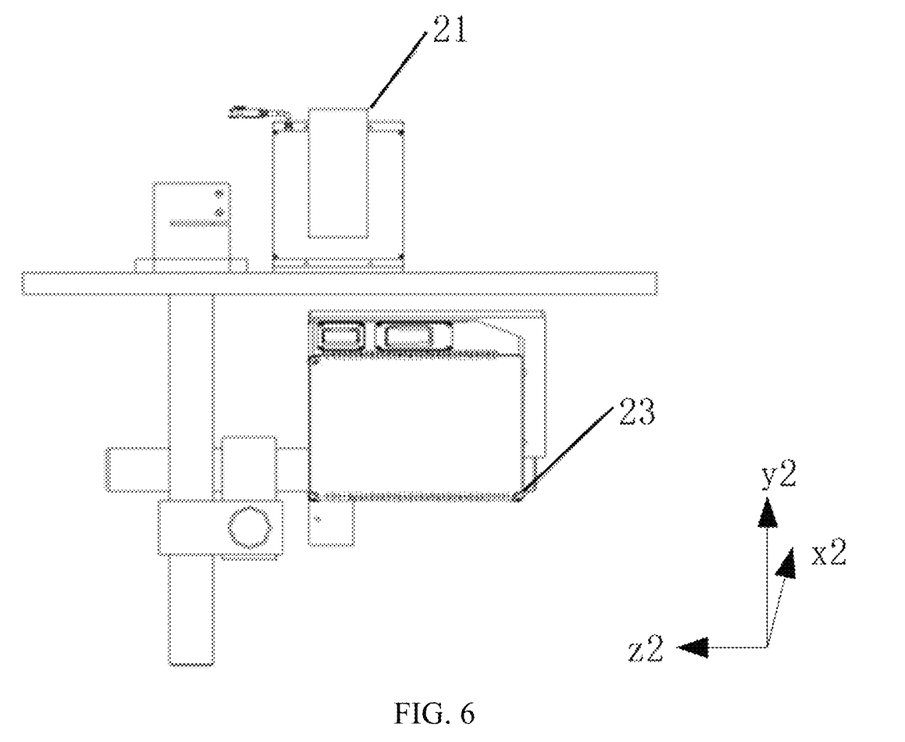
FIG. 6 is a left view of a short-side detection layout of a battery cell according to an embodiment of this application.

The short-side detection layout of the battery cell 21 is similar, and not described in detail here. The length of the short side of the battery cell 21 is relatively short. Therefore, usually the field-of-view of a single structured light camera can cover the short side of the battery cell 21. In this case, 1 structured light camera is disposed on each short side of the battery cell 21. FIG. 6 is a left view of a short-side detection layout according to an embodiment of this application. The left view of the short-side detection layout of the battery cell is a view obtained by observing along a positive direction of the x2 axis. As shown in FIG. 6, the field-of-view of 1 second structured light camera 23 can cover the short side of the battery cell 21. Therefore, in practical applications, the mounting position of the structured light camera is not necessarily limited as long as the short side of the battery cell 21 falls within the field-of-view of this structured light camera.

In some application scenarios, the length of the long side/short side of the battery cell 21 is relatively long, and goes beyond the field-of-view of the structured light camera. In this case, the shot image of the long-side/short-side weld is incomplete, thereby impairing the detection accuracy.

To solve the above problem, in some embodiments, the arrangement of the detection device may include:

If the length of the long side of the battery cell 21 is greater than the field-of-view of the first structured light camera 22, N is determined based on the length of the long side of the battery cell 21 and the field-of-view of the first structured light camera 22; and If the length of the short side of the battery cell 21 is greater than the field-of-view of the second structured light camera 23, M is determined based on the length of the short side of the battery cell 21 and the field-of-view of the second structured light camera 23.

The field-of-view of the structured light camera may be calculated using the parameters of the structured light camera. As an example, the field-of-view is calculated as: field-of-view=working distance×target surface size/focal length. The target surface size means the size of the sensor (for example, a diagonal line of the target surface of the sensor, and the length and width of the target surface). For example, assuming that the target surface size of the sensor in the structured light camera is 12.8 mm, the focal length of the lens is 100 mm, and the working distance is 0.5 m, the field-of-view is calculated as: field-of-view=500×12.8/100=64 mm. That is, the field-of-view is 0.64 m.

Optionally, if the length of the long side of the battery cell 21 is greater than the field-of-view of the first structured light camera 22, N is greater than a first value. The first value is a ratio of the length of the long side of the battery cell 21 to the field-of-view of the first structured light camera 22.

If the length of the short side of the battery cell 21 is greater than the field-of-view of the second structured light camera 23, M is greater than a second value. The second value is a ratio of the length of the short side of the battery cell 21 to the field-of-view of the second structured light camera 23.

Optionally, N may be a minimum integer greater than the first value.

As an example, assuming that the length of the long side of the battery cell 21 is 1 m, and the field-of-view of the first structured light camera 22 is 0.64 m, then the first value is 1/0.64=1.5625, and N is equal to 2.

In this way, a corresponding number of first structured light cameras 22 and second structured light cameras 23 can be disposed based on the actual size of the battery cell 21, so as to ensure a complete image of the weld of the battery cell 21, and in turn, improve the detection accuracy.

Based on the detection device provided in the above embodiment, a detection method is provided according to an embodiment of this application, as described below.

Figure 7:
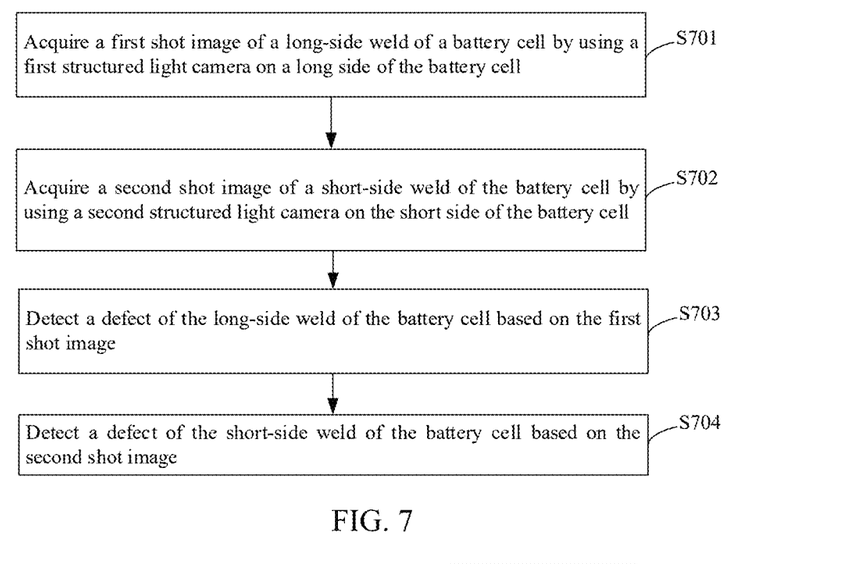
FIG. 7 is a schematic flowchart of a detection method according to an embodiment of this application.

FIG. 7 is a schematic flowchart of a detection method according to an embodiment of this application. The detection method is applicable to a control terminal. By way of example and not limitation, the method may include the following steps:

S701: Acquire a first shot image of a long-side weld of a battery cell 21 by using a first structured light camera 22 on a long side of the battery cell 21 (that is, the battery cell under detection);

S702: Acquire a second shot image of a short-side weld of the battery cell 21 by using a second structured light camera 23 on the short side of the battery cell 21;

S703: Detect a defect of the long-side weld of the battery cell 21 based on the first shot image; and S704: Detect a defect of the short-side weld of the battery cell 21 based on the second shot image.

In this embodiment of this application, the shot image acquired by the structured light camera is processed to detect the weld defects of the battery cell. The image captured by the structured light camera is of a high resolution and a wide angle-of-view, thereby improving the detection precision.

As mentioned above, in some application scenarios, the detection workspace of long-side detection and the detection workspace of short-side detection may be integrated together. In such application scenarios, a detection process may include the following steps: the control terminal sends a control signal to a conveyor belt after the battery cell 21 is welded to form a weld, so that the conveyor belt conveys the battery cell 21 to a detection workspace; the detection workspace sends an in-position signal to the control terminal after the battery cell 21 is in position; the control terminal sends a shooting signal to the first structured light camera 22 and the second structured light camera 23 separately after receiving the in-position signal; the first structured light camera 22 acquires a first shot image of the long-side weld of the battery cell 21 based on the shot signal, and sends the first shot image to the control terminal; the second structured light camera 23 acquires a second shot image of the short-side weld of the battery cell 21 based on the shot signal, and sends the second shot image to the control terminal; the control terminal sends a control signal to the conveyor belt after acquiring the shot image, so that the conveyor belt conveys the current battery cell 21 away from the detection workspace, and conveys a next battery cell under detection to the detection workspace.

In some other application scenarios, the detection workspace of long-side detection and the detection workspace of short-side detection may be disposed separately. In such application scenarios, a detection process may include the following steps: (i) the control terminal sends a control signal to a conveyor belt, so that the conveyor belt conveys the battery cell 21 to a long-side welding workspace; (ii) the long-side welding workspace welds the long side of the battery cell 21 to form a seam after the battery cell 21 is in position, and sends a completion signal to the control terminal after the welding is completed; (iii) the control terminal sends a control signal to the conveyor belt after receiving the completion signal, so that the conveyor belt conveys the battery cell 21 to the long-side detection workspace; (iv) the control terminal sends a shooting signal to the first structured light camera 22 after the battery cell 21 is in position; (v) the first structured light camera 22 acquires a first shot image of the long-side weld of the battery cell 21 based on the shooting signal, and sends the first shot image to the control terminal; (vi) the control terminal sends a control signal to the conveyor belt after acquiring the first shot image, so that the conveyor belt conveys the battery cell 21 to a short-side welding workspace; (vii) the short-side welding workspace welds the short side of the battery cell 21 to form a weld after the battery cell 21 is in position, and sends a completion signal to the control terminal after the welding is completed; (viii) the control terminal sends a control signal to the conveyor belt after receiving the completion signal, so that the conveyor belt conveys the battery cell 21 to the short-side detection workspace; (ix) the control terminal sends a shooting signal to the second structured light camera 23 after the battery cell 21 is in position; (x) the second structured light camera 23 acquires a second shot image of the short-side weld of the battery cell 21 based on the shooting signal, and sends the second shot image to the control terminal; and (xi) and the control terminal sends a control signal to the conveyor belt after acquiring the second shot image, so that the conveyor belt conveys the current battery cell 21 away from the short-side detection workspace.

It is hereby noted that, the above process is just an example of the weld detection process of the battery cell, and the detection process is not particularly limited herein. In practical applications, the detection process may be designed depending on the distribution of workspaces, the workflow, and the like.

In an embodiment of this application, the structured light camera may be a 3D structured light camera. The 3D structured light camera can shoot a 3D image and a 2D image. For example, when the light is supplemented, the camera shoots a 3D image; when the light is not supplemented, the camera shoots a 2D image. The control terminal may control the structured light camera to acquire a 3D image and/or a 2D image, or the structured light camera may be preset to automatically acquire a 3D image and a 2D image successively.

Figure 8:
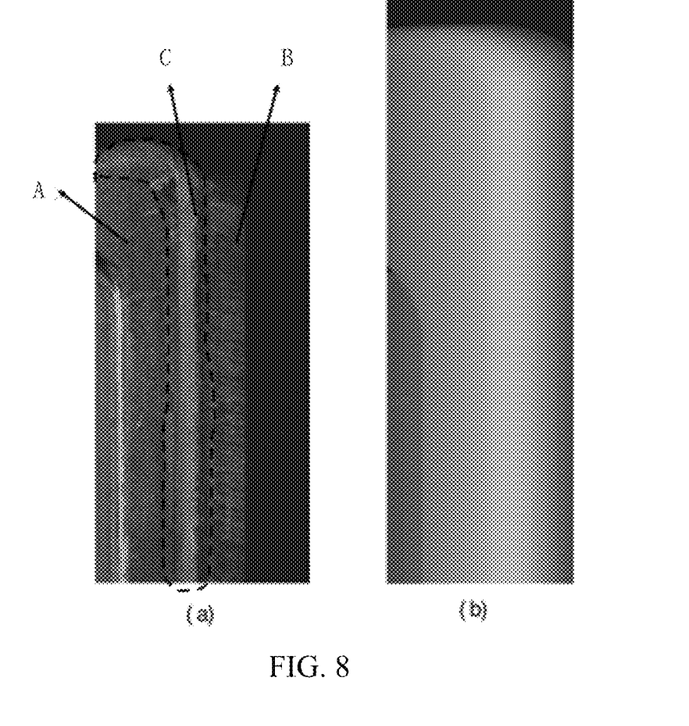
FIG. 8 is a schematic diagram of a shot image according to an embodiment of this application.

As an example, FIG. 8 is a schematic diagram of a shot image according to an embodiment of this application. Part (a) of FIG. 8 is a grayscale image (2D image), and part (b) of FIG. 8 is a depth image (3D image). As shown in part (a) of FIG. 8, the left side is a top cover part A of the battery cell, and the right side is an aluminum shell part B of the battery cell. The junction between the top cover and the aluminum shell is a weld part (part C in the dashed line region in part (a) of FIG. 8). As can be seen from part (a) of FIG. 8, the grayscale value of the weld part C is different from the grayscale value of the top cover part A and the aluminum shell part B located on two sides. The control terminal may locate a weld pass based on the pixel grayscale values of the top cover, the aluminum shell, and the weld pass in the grayscale image shown in part (a) of FIG. 8, and then recognize and classify the bumps and dimples on the weld pass by using the depth information included in the depth image shown in part (b) of FIG. 8, so as to obtain a detection result.

In this embodiment of this application, the control terminal may detect the welds in the first shot image and the second shot image based on an existing image detection method. The image detection method is not particularly limited here.

In some application scenarios, when a plurality of structured light cameras are disposed on each long side/short side of the battery cell 21, the fields-of-view of the plurality of structured light cameras may overlap. The structured light beams emitted during imaging may interfere with each other, thereby impairing the shooting effect and the detection precision.

To solve the above problem, in an embodiment, when N first structured light cameras 22 are disposed on each long side of the battery cell 21 (N is an integer greater than 1), the control terminal controls, for each long side of the battery cell 21, at least one first camera among the N first structured light cameras 22 on the long side to expose simultaneously, so as to acquire a first shot image captured by the first camera. The fields-of-view do not overlap between the first cameras.

After acquiring the first shot image captured by the first camera, the control terminal controls at least one second camera among the N first structured light cameras 22 on the long side to expose simultaneously, so as to acquire a first shot image captured by the second camera. The fields-of-view do not overlap between the second cameras. The second camera is a structured light camera other than the first camera among the N first structured light cameras 22 on the long side.

Figure 9:
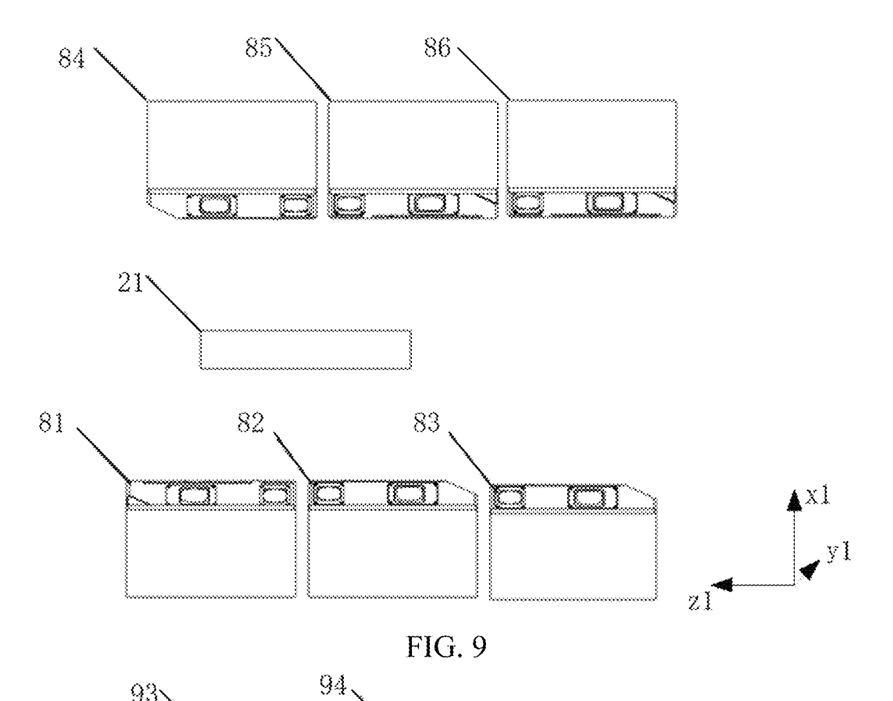
FIG. 9 is a top view of a long-side detection layout of a battery cell according to an embodiment of this application.

Using the long-side detection layout of the battery cell as an example, FIG. 9 is a top view of a long-side detection layout of a battery cell according to an embodiment of this application. The top view of the long-side detection layout of the battery cell is a view obtained by observing along a negative direction of the y1 axis. As shown in FIG. 9, 3 structured light cameras are disposed on each long side of the battery cell 21. On one of the long sides, the fields-of-view of the two adjacent structured light cameras 81 and 82 overlap, the fields-of-view of the two adjacent structured light cameras 82 and 83 overlap, but the fields-of-view of the two structured light cameras 81 and 83 do not overlap. In a controlling process, the structured light cameras 81 and 83 may be controlled to expose simultaneously first (in this case, the cameras 81 and 83 are first cameras), and then the structured light camera 82 is controlled to expose (in this case, the camera 82 is a second camera). Similarly, for the other long side, the structured light cameras 84 and 86 may be controlled to expose simultaneously first (in this case, the cameras 84 and 86 are first cameras), and then the structured light camera 85 is controlled to expose (in this case, the camera 85 is a second camera).

Understandably, the structured light camera on one long side may be controlled to expose first, and then the structured light camera on the other long side is controlled to expose. Alternatively, the structured light cameras on the two long sides may be controlled to expose concurrently. For example, the structured light cameras 81, 83, 84, and 86 are controlled to expose simultaneously first (in this case, the cameras 81, 83, 84, and 86 are first cameras), and then the structured light cameras 82 and 85 are controlled to expose simultaneously (in this case, the cameras 82 and 85 are second cameras).

Understandably, the short-side detection layout of the battery cell is based on the same principles as the long-side detection layout of the battery cell, and is not described in detail here.

In an embodiment of this application, a plurality of structured light cameras located on the same side of the battery cell without overlap of the fields-of-view are controlled to expose simultaneously, thereby effectively avoiding light interference during exposure of the plurality of structured light cameras on each long side/short side of the battery cell, effectively improving the shooting effect, and in turn, improving the detection precision.

In some other application scenarios, the structured light emitted by two structured light cameras disposed opposite to each other on two long sides or two short sides of the battery cell 21 during imaging may interfere with each other. Especially, for the structured light cameras located at the R corner on two sides of the battery cell 21, light interference is more prone to occur in a part of the fields-of-view of such cameras because the part is not shielded by the battery cell, thereby affecting the shooting effect and reducing the detection precision.

To solve the above problem, in an embodiment, when N first structured light cameras 22 are disposed on each long side of the battery cell 21 (N is an integer greater than 1), the control terminal controls a third camera and a fourth camera among the 2N first structured light cameras 22 of the detection device to expose simultaneously, where the third camera and the fourth camera are located on different long sides of the battery cell 21 respectively, and a mounting position of the third camera is not symmetric to the mounting position of the fourth camera around the short-side perpendicular bisector of the battery cell 21. After acquiring the first shot image captured by the third camera and the first shot image captured by the fourth camera, the control terminal controls a fifth camera and a sixth camera to expose simultaneously. The fifth camera and the sixth camera are located on different long sides of the battery cell 21 respectively, and a mounting position of the fifth camera is not symmetric to the mounting position of the sixth camera around the short-side perpendicular bisector of the battery cell 21. The fifth camera and the sixth camera are the first structured light cameras 22 other than the third camera and the fourth camera.

Still using the long-side detection layout of the battery cell as an example, as shown in FIG. 9, it is assumed that the fields-of-view of the two oppositely disposed structured light cameras 81 and 84 overlap, the fields-of-view of the two structured light cameras 82 and 85 overlap, and the fields-of-view of the two structured light cameras 83 and 86 overlap. The phrase "oppositely disposed" means that the two structured light cameras are located on different long sides of the battery cell 21 respectively and mounted at positions that are symmetric to each other with respect to the short-side perpendicular bisector of the battery cell 21.

In a controlling process, the structured light cameras 81 and 85 may be controlled to expose simultaneously first, and then the structured light cameras 82 and 86 are controlled to expose simultaneously (in this case, the camera 82 is a fifth camera, and the camera 86 is a sixth camera). Finally, the structured light cameras 83 and 84 are controlled to expose simultaneously.

It is hereby noted that the third camera, the fourth camera, the fifth camera, and the sixth camera referred to in this embodiment of this application are termed relatively. For example, in the case that the structured light cameras 81 and 85 are controlled to expose simultaneously first, and then the structured light cameras 82 and 86 are controlled to expose simultaneously, the structured light camera 81 is regarded as a third camera, the structured light camera 85 is regarded as a fourth camera, the structured light camera 82 is regarded as a fifth camera, and the structured light camera 86 is regarded as a sixth camera. In the case that the structured light cameras 82 and 86 are controlled to expose simultaneously first, and then the structured light cameras 83 and 84 are controlled to expose simultaneously, the structured light camera 82 is regarded as a third camera, the structured light camera 86 is regarded as a fourth camera, the structured light camera 83 is regarded as a fifth camera, and the structured light camera 84 is regarded as a sixth camera. The foregoing process goes on until all the structured light cameras on both sides of the battery cell 21 are controlled to complete imaging.

Understandably, the short-side detection layout of the battery cell is based on the same principles as the long-side detection layout of the battery cell, and is not described in detail here.

In this embodiment of this application, a plurality of structured light cameras located on different sides of the battery cell and mounted at non-opposite positions are controlled to expose simultaneously, thereby effectively avoiding interference between the structured light beams emitted by the structured light cameras on different sides of the battery cell during imaging, effectively improving the shooting effect, and in turn, improving the detection precision.

Based on the control method described in the above embodiment, the following describes an example in which 2 structured light cameras are disposed on each of two long sides of the battery cell.

To avoid not only the light interference between the structured light cameras on the same side of the long side of the battery cell but also the light interference between the structured light cameras on different sides of the battery cell, a control method is: controlling a seventh camera and an eighth camera among the 4 first structured light cameras 22 to expose simultaneously, where the seventh camera and the eighth camera are located on different long sides of the battery cell 21 respectively and located on the two sides of the long-side perpendicular bisector 24 of the battery cell 21 respectively; and, controlling, after acquiring the first shot image captured by the seventh camera and the first shot image captured by the eighth camera, a ninth camera and a tenth camera among the 4 first structured light cameras 22 of the detection device to expose simultaneously, so as to acquire a first shot image captured by the ninth camera and a first shot image captured by the tenth camera. The ninth camera and the tenth camera are located on different long sides of the battery cell 21 respectively and located on the two sides of the long-side perpendicular bisector 24 of the battery cell 21 respectively. The ninth camera and the tenth camera are the first structured light cameras 22 other than the seventh camera and the eighth camera.

Figure 10:
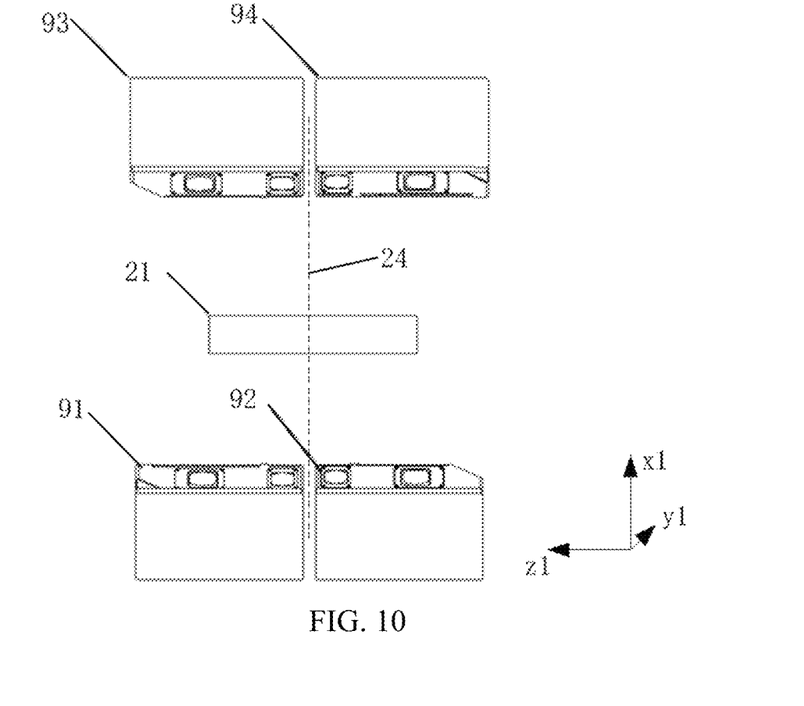
FIG. 10 is a top view of a long-side detection layout of a battery cell according to another embodiment of this application.

As an example, FIG. 10 is a top view of a long-side detection layout of a battery cell according to another embodiment of this application. As shown in FIG. 10, 2 structured light cameras are disposed on each of two long sides of the battery cell. Two structured light cameras 91 and 92 are disposed on one long side of the battery cell 21, and two structured light cameras 93 and 94 are disposed on the other long side of the battery cell. The structured light cameras 91 and 92 are located on the two sides of the long-side perpendicular bisector 24 of the battery cell 21 respectively, and the structured light cameras 93 and 94 are located on the two sides of the long-side perpendicular bisector 24 of the battery cell 21 respectively.

In the controlling process, the control terminal may control the structured light cameras 91 and 94 to expose simultaneously first (in this case, the structured light camera 91 is regarded as a seventh camera, and the structured light camera 94 is regarded as an eighth camera), and then control the structured light cameras 92 and 93 to expose simultaneously (in this case, the structured light camera 92 is regarded as a ninth camera, and the structured light camera 93 is regarded as a tenth camera). The control terminal may further control the structured light cameras 92 and 93 to expose simultaneously first (in this case, the structured light camera 92 is regarded as a seventh camera, and the structured light camera 93 is regarded as an eighth camera), and then control the structured light cameras 91 and 94 to expose simultaneously (in this case, the structured light camera 91 is regarded as a ninth camera, and the structured light camera 94 is regarded as a tenth camera).

Understandably, when more than 2 structured light cameras are disposed on each of the long sides of the battery cell 21, the control logic is similar. As an example, as shown in FIG. 9, when 3 structured light cameras are disposed on each of the two long sides of the battery cell 21, the control process may be: first, controlling the structured light cameras 81, 85, and 83 to expose simultaneously, and then controlling the structured light cameras 82, 84 and 86 to expose simultaneously. In this case, the structured light cameras 81 and 83 may be regarded as seventh cameras, the structured light camera 85 may be regarded as an eighth camera, the structured light camera 82 may be regarded as a ninth camera, and the structured light cameras 84 and 86 may be regarded as tenth cameras.

This embodiment of this application considers both the light interference between the structured light cameras on the same side of the battery cell and the light interference between the structured light cameras on different sides of the battery cell. The foregoing control process avoids both the light interference between the structured light cameras on the same side of the battery cell and the light interference between the structured light cameras on different sides of the battery cell, effectively improves the shooting effect, and in turn, improves the detection precision.

Understandably, in the foregoing embodiments, the sequence number of a step does not mean the implementation order of the step. The implementation order of each step depends on its functionality and intrinsic logic, but does not constitute any limitation on the implementation process of an embodiment of this application.

Figure 11:
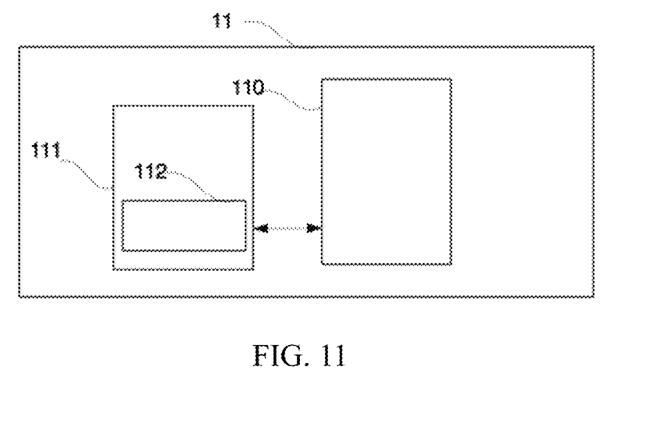
FIG. 11 is a schematic structural diagram of a terminal device according to an embodiment of this application.

FIG. 11 is a schematic structural diagram of a terminal device according to an embodiment of this application. The terminal device according to this embodiment of this application can serve functions of the control terminal described in the preceding embodiment. As shown in FIG. 11, the terminal device 11 according to this embodiment includes: at least one processor 110 (only one is shown in FIG. 11), a memory 111, and a computer program 112 stored in the memory 111 and executable on the at least one processor 110. When executing the computer program 112, the processor 110 implements the steps in any one of the detection method embodiments described above.

The terminal device may be a computing device such as a desktop computer, a notebook computer, a palmtop computer, or a cloud server. The terminal device may include, but not limited to, a processor or a memory. A person skilled in the art understands that FIG. 11 is just an example of the terminal device 11, but does not constitute a limitation on the terminal device 11. The terminal device may include more or less components than what is shown in the drawing, and may include a combination of some components or include other different components, for example, may include an input/output device, a network access device, and the like.

The processor 110 may be a central processing unit (CPU). Alternatively, the processor 110 may be another general-purpose processor, a digital signal processor (DSP), an application-specific integrated circuit (ASIC), a field programmable gate array (FPGA), or another programmable logical device, a discrete gate, or a transistor logical device, a discrete hardware component, or the like. The general-purpose processor may be a microprocessor, or the processor may be any conventional processor or the like.

In some embodiments, the memory 111 may be an internal storage unit of the terminal device 11 such as a hard disk or an internal memory of the terminal device 11. In some other embodiments, the memory 111 may be an external storage device of the terminal device 11, for example, a plug-in hard disk, a smart memory card (SMC), a secure digital (SD) card, a flash card, or the like fitted on the terminal device 11. Further, the memory 111 may include both an internal storage unit of the terminal device 11 and an external storage device. The memory 111 is configured to store an operating system, an application program, a boot loader, data, and other programs such as program code of the computer program. In addition, the memory 111 may be configured to temporarily store data already output or to be output.

An embodiment of this application further provides a computer-readable storage medium. The computer-readable storage medium stores a computer program. When executed by a processor, the computer program implements the steps in any one of the method embodiments described above.

An embodiment of this application provides a computer program product. When running on a terminal device, the computer program product causes the terminal device to perform the steps in any one of the method embodiments described above.

When implemented in the form of a software functional unit and sold or used as an independent product, the integrated units may be stored in a computer-readable storage medium. Based on such an understanding, all or part of the processes in a method described in any one of the foregoing embodiments of this application may be performed by relevant hardware instructed by a computer program. The computer program may be stored in a computer-readable storage medium. When executed by a processor, the computer program can perform the steps in any one of the method embodiments described above. The computer program includes computer program code. The computer program code may be in the form of source code, object code, an executable file, or some intermediate forms, or the like. The computer-readable medium may include at least: a recording medium, a computer memory, a read-only memory (ROM), a random access memory (RAM), an electrical carrier signal, a telecommunications signal, a software distribution medium, and any entity or device capable of carrying computer program code into a device/terminal device, such as a USB disk, a mobile hard disk, a magnetic disk, or a CD-ROM. Pursuant to legislation and patent practice in some jurisdictions, a computer-readable medium is not an electrical carrier signal or a telecommunications signal.

In the foregoing embodiments, the description of each embodiment stresses a different facet. For a part that is not described in detail or set forth in one embodiment, reference may be made to the relevant description in other embodiments.

A person of ordinary skill in the art is aware that the exemplary units and algorithm steps described with reference to an embodiment disclosed herein can be implemented by electronic hardware or by a combination of computer software and electronic hardware. Whether the functions are performed by hardware or software depends on particular applications and design constraint conditions of the technical solutions. A person skilled in the art may use different methods to implement the described functions for each particular application, but such implementation still falls within the scope of this application.

Understandably, in an embodiment of this application, the disclosed device/terminal device and method may be implemented by other means. For example, the described device/terminal device embodiment is merely illustrative. For example, the division of the device into several modules or units is merely a type of logic function division, and the device may be divided in other manners in practical implementations. For example, a plurality of units or components may be combined or integrated into another system, or some features may be ignored or skipped. In addition, a mutual coupling or direct coupling or communications connection illustrated or discussed herein may be an indirect coupling or communications connection implemented through some interfaces, devices, or units, and may be in electrical, mechanical or other forms.

The units described as discrete components may be physically separated or not, and the components illustrated as units may be physical units or not, and specifically, may be located in one place or distributed on a plurality of network elements. Some or all of the units may be selected according to actual needs to achieve the objectives of the solutions of the embodiments hereof.

The foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some technical features in the technical solutions. Such modifications and replacements do not make the essence of the corresponding technical solutions depart from the spirit and scope of the technical solutions in each embodiment of this application, but still fall within the protection scope of this application.

What is claimed is:

1. A detection method, applied to a detection device, wherein the detection device comprises 2N first structured light cameras and 2M second structured light cameras, N first structured light cameras are disposed on each long side of a battery cell under detection, and M second structured light cameras are disposed on each short side of the battery cell under detection, wherein N and M are both positive integers; the N first structured light cameras on each long side of the battery cell under detection are mounted symmetrically about an axis that is a long-side perpendicular bisector of the battery cell under detection; and the M second structured light cameras on each short side of the battery cell under detection are mounted symmetrically about an axis that is a short-side perpendicular bisector of the battery cell under detection; the detection method comprising:

acquiring a first shot image of a long-side weld of the battery cell under detection by using a first structured light camera on the long side of the battery cell under detection;

acquiring a second shot image of a short-side weld of the battery cell under detection by using a second structured light camera on the short side of the battery cell under detection;

detecting a defect of the long-side weld of the battery cell under detection based on the first shot image; and detecting a defect of the short-side weld of the battery cell under detection based on the second shot image;

when N is an integer greater than 1, acquiring the first shot image of the long-side weld of the battery cell under detection by using the first structured light camera on the long side of the battery cell under detection comprises:

controlling, for each long side of the battery cell under detection, at least one first camera among the N first structured light cameras on the long side to expose simultaneously, so as to acquire a first shot image captured by the first camera, wherein fields-of-view do not overlap between the first cameras;

controlling, after acquiring the first shot image captured by the first camera, at least one second camera among the N first structured light cameras on the long side to expose simultaneously, so as to acquire a first shot image captured by the second camera, wherein fields-of-view do not overlap between the second cameras, and the second camera is a structured light camera other than the first camera among the N first structured light cameras on the long side;

controlling a third camera and a fourth camera among the 2N first structured light cameras of the detection device to expose simultaneously, wherein the third camera and the fourth camera are located on different long sides of the battery cell under detection respectively, and a mounting position of the third camera is not symmetric to a mounting position of the fourth camera around the short-side perpendicular bisector of the battery cell under detection; and controlling, after acquiring the first shot image captured by the third camera and the first shot image captured by the fourth camera, a fifth camera and a sixth camera to expose simultaneously, wherein the fifth camera and the sixth camera are located on different long sides of the battery cell under detection respectively, a mounting position of the fifth camera is not symmetric to a mounting position of the sixth camera around the short-side perpendicular bisector of the battery cell under detection, and the fifth camera and the sixth camera are the first structured light cameras other than the third camera and the fourth camera.

2. The detection method according to claim 1, wherein, when N is equal to 2, the detection device comprises 4 first structured light cameras, and 2 first structured light cameras are disposed on each long side of the battery cell under detection; and acquiring the first shot image of the long-side weld of the battery cell under detection by using the first structured light camera on the long side of the battery cell under detection comprises:

controlling a seventh camera and an eight camera among the 4 first structured light cameras of the detection device to expose simultaneously, wherein the seventh camera and the eighth camera are located on different long sides of the battery cell under detection respectively and located on two sides of the long-side perpendicular bisector of the battery cell under detection respectively; and controlling, after acquiring the first shot image captured by the seventh camera and the first shot image captured by the eighth camera, a ninth camera and a tenth camera among the 4 first structured light cameras of the detection device to expose simultaneously, so as to acquire a first shot image captured by the ninth camera and a first shot image captured by the tenth camera, wherein the ninth camera and the tenth camera are located on different long sides of the battery cell under detection respectively and located on the two sides of the long-side perpendicular bisector of the battery cell under detection respectively, and the ninth camera and the tenth camera are the first structured light cameras other than the seventh camera and the eighth camera.

3. A terminal device, comprising:
a memory storing a computer program; and
a processor configured to execute the computer program to implement the detection method according to claim 1.

4. A computer-readable storage medium, storing a computer program that, when executed by a processor, causes the processor to implement the detection method according to claim 1.

* * * * *